(No Model.)

E. S. AMROCK.
BRAKE FOR ELECTRIC CARS.

No. 469,383. Patented Feb. 23, 1892.

Witnesses.
Winifred F. Kerwin.
John J. Moore

Inventor.
Edward S. Amrock
by Edwin Planta
Attorney

UNITED STATES PATENT OFFICE.

EDWARD S. AMROCK, OF WALTHAM, MASSACHUSETTS.

BRAKE FOR ELECTRIC CARS.

SPECIFICATION forming part of Letters Patent No. 469,383, dated February 23, 1892.

Application filed August 10, 1891. Serial No. 402,211. (No model.)

*To all whom it may concern:*

Be it known that I, EDWARD S. AMROCK, a citizen of the United States, residing at Waltham, in the county of Middlesex and State of Massachusetts, have invented certain new and useful Improvements in Brakes for Electric and other Cars, of which the following, taken in connection with the accompanying drawings, is a specification.

The object of my invention is to produce a hydrostatic brake for electric and other cars, and also to cut off the supply of electricity when the brake is applied.

The invention consists of a hydrostatic brake arranged and secured to the under side of the car, the piston of the small cylinder being connected to the brake-lever and the piston of the large cylinder connected to the brake-shoe, and also in the means for operating the electric switch to cut off the current when the brake is applied, as hereinafter fully described, and pointed out in the claims.

Figure 1:
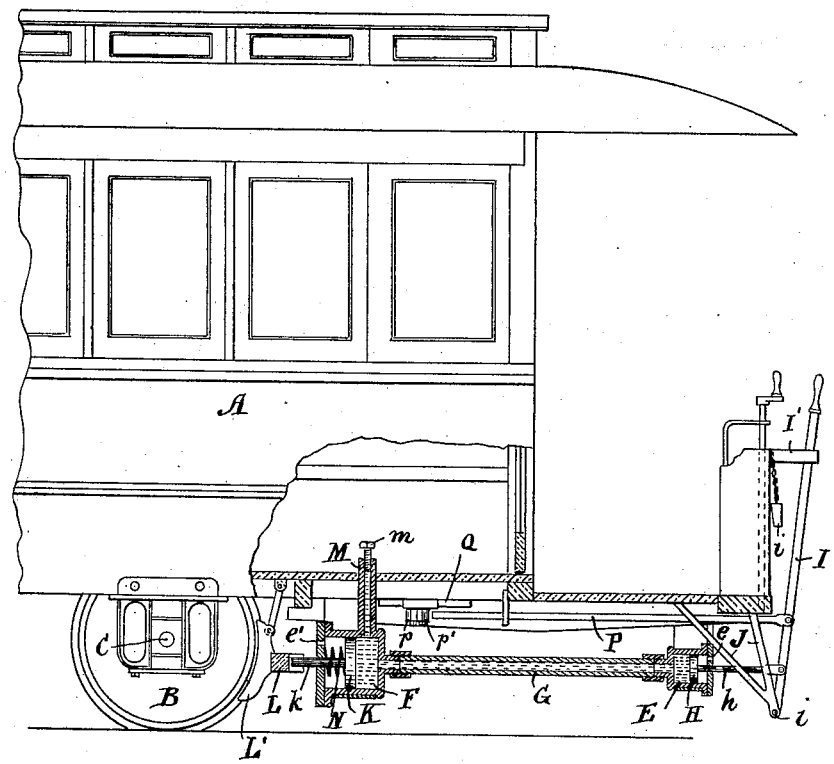
Figure 2:
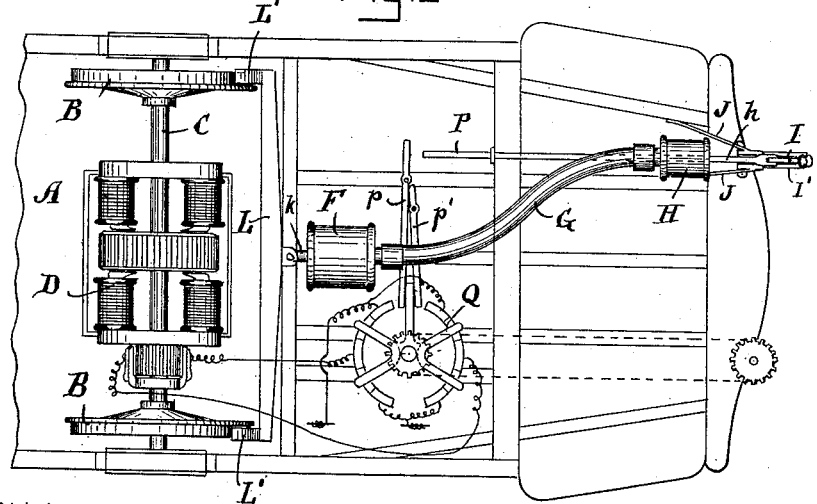

Referring to the accompanying drawings, Figure 1 represents a side view, partly in section, of a portion of a car fitted with a brake and cut-off embodying my invention. Fig. 2 is a plan of the under side of the same.

A represents a car, B the wheels, C the axle, and D a motor secured upon the same, all of which may be of any desired construction.

To the under side of the floor of the car is secured two cylinders E E, connected together by a pipe G, which may be flexible or not, as required. The cylinder F is much larger in diameter than the cylinder E. In the cylinder E is fitted a piston H, which by rod $h$ is connected to the brake-lever I, which is fulcrumed at $i$ in suitable frame-work J, secured to the under side of the floor or to the platform-beams.

I' is a saddle secured to the dash-board and in which the upper end of the lever I works, and $i'$ is a wedge-shaped block, which (if required) may be inserted in the saddle behind the lever to hold it to keep the brakes applied.

In the cylinder F is fitted a piston K, which by rod $k$ is connected to the brake-shoe lever L, that carries the brake-shoes L'. The cylinder F is formed at its upper side with a pipe M, which may extend up through the floor of the car, and through which pipe the pipe G and cylinders E F, between the pistons H K, can be filled with water or other liquid. The upper end of the pipe M is fitted with a long screw $m$, so that should there be any escape of water, from leakage or other cause, the screw $m$ can be turned down, so that the liquid will be in a compact body.

Between the rear of the piston K and the head of the cylinder F is interposed a spring N of sufficient strength to force the pistons back when the brake-lever has been released, and in the head of each cylinder is a small hole $e$ $e'$ to allow for the escape and admission of air as the pistons are operated.

To the brake-rod I is connected one end of a rod or bar P, the other end of which acts upon and operates mechanism connected with the electric switch Q, so that when the brake-lever is operated the switch will be turned so as to cut off the supply of the electric current to the motor.

In the drawings I have shown a lever $p$, that is operated by the rod P, and an auxiliary lever $p'$, operated by the lever $p$ so as to move the switch when the brake-lever is moved; but any other suitable mechanism may be employed. Of course the switch must be free to be operated in the usual manner when the brakes are off.

The operation is as follows: The pipe G and the cylinders between the pistons being filled with water or other liquid, when it is desired to apply the brake the driver draws upon the upper end of the lever I, which causes the piston H in the cylinder E to be forced back and through the water or other fluid operates upon the piston K in the cylinder F with an increased force, (according to the difference in the diameters of the two cylinders,) and as the brake-bar is by the rod $k$ connected to the piston K the brakes are forced into contact with the wheels. By the same operation of the lever I the rod P operates the mechanism connected to the electric switch, and the current is cut off at the same moment that the brakes are applied.

It will be seen that by this construction of brake almost any desired power can be employed for the application of the brakes and the electric current is simultaneously cut off and that by the operation of a single lever.

What I claim as my invention is—

1. In combination with a car provided with and operated by an electric motor, a hydrostatic brake and a connection between the brake and the motor for automatically breaking the circuit of the motor when the brake is applied, substantially as set forth.

2. In combination with a car provided with and operated by an electric motor, an electric switch, a lever engaging with the switch, a hydrostatic brake, a lever for operating it, and a rod or bar connected with the brake-lever at one end and adapted to engage with the switch-lever at the other end, whereby the circuit is broken automatically by the setting of the brake, substantially as set forth.

3. In combination with a car provided with and operated by an electric motor, a switch, a hydrostatic brake comprising two cylinders, each provided with a piston and a stem or rod projecting therefrom, a brake-shoe connected with and operated by one of the pistons and its rod, a lever connected with the other piston-rod, and a rod pivotally connected with the lever, the free end of which is adapted to engage with the switch and break the circuit when the brake is set, substantially as set forth.

4. In a hydrostatic brake, the combination of two cylinders of different areas, each of which is provided with an air-aperture and the larger cylinder is provided with a supply-pipe, an adjustable and removable plug in the end of the pipe, a connection between the cylinders, a piston in each cylinder, the larger one of which is connected with and operates the brake-shoe, and a lever for operating the smaller piston, substantially as set forth.

In testimony whereof I have signed my name to this specification, in the presence of two subscribing witnesses, on this 30th day of July, A. D. 1891.

EDWARD S. AMROCK.

Witnesses:
JOHN H. AMROCK,
MARTIN H. COWDREY.